United States Patent [19]
McDonald

[11] 3,820,748
[45] June 28, 1974

[54] SPEED SENSITIVE ACTUATOR

[75] Inventor: Alexander B. McDonald, Long Beach, Calif.

[73] Assignee: McDonnell Douglas Corporation, Santa Monica, Calif.

[22] Filed: May 3, 1973

[21] Appl. No.: 357,021

[52] U.S. Cl. .................................................. 244/149
[51] Int. Cl. .................................................. B64d 17/52
[58] Field of Search .............. 244/149, 150, 147

[56] References Cited
UNITED STATES PATENTS

| | | | |
|---|---|---|---|
| 2,937,831 | 5/1960 | Mayo et al. | 244/149 |
| 2,953,063 | 9/1960 | Hallerberg | 244/149 |
| 3,667,705 | 6/1972 | Snyder | 244/150 |
| 3,690,605 | 9/1972 | Jones | 244/149 |

Primary Examiner—Albert J. Makay
Assistant Examiner—Donald W. Underwood
Attorney, Agent, or Firm—Robert O. Richardson; Walter J. Jason; Donald J. Royer

[57] ABSTRACT

A speed sensitive device to control the operation of an aircraft escape system and to improve its performance at lower speed conditions. The exterior of a bellows is exposed to atmospheric pressure and the inside of this or another bellows connected thereto is exposed to the total pressure of the airstream. The firing mechanism will not release until a combination of predetermined values of atmospheric pressure and dynamic pressure is present.

9 Claims, 5 Drawing Figures

PATENTED JUN 28 1974 3,820,748

PRIOR ART

SPEED SENSITIVE ACTUATOR

BACKGROUND OF THE PRESENT INVENTION

A device for automatically releasing a parachute after descent to a selected altitude and/or after a delay of a fixed period of time is disclosed in U.S. Pat. No. 2,937,831 to Mayo and Nichols and assigned to the present assignee. At high altitude the safety pin may be removed immediately but the sear will not release until descent to a preselected lower altitude where the more dense air causes collapse of the evacuated bellows. In the event of a low altitude bailout where the bellows is already compressed to sear release position and the safety pin is removed, a time delay inherent in the cartridge construction causes a momentary hesitation in the actuation of the gas operated piston. This provides time to decelerate and for the pilot to clear the plane.

The automatic parachute release disclosed in the above-identified Mayo et al. patent has an evacuated bellows which is used to control the release of a spring loaded firing mechanism. The evacuated bellows expands or contracts as a function of the spring rate of the bellows and atmospheric pressure. Once the arming pin is removed, the bellows will only release the spring loaded mechanism at atmospheric pressures above a predetermined value. When the mechanism is released, a cartridge is fired and the gas pressure causes the movement of a piston and cable which releases the parachute.

Release devices in an escape system are usually designed for the highest speed at which they are required to operate and the performance tends to degrade at lower speed conditions. To improve performance at lower speed conditions, acceleration sensitive switches and speed sensitive aneroid switch and electronic sequencer systems have been used. A more simple and reliable method is needed.

SUMMARY OF THE PRESENT INVENTION

In accordance with the present invention a simple mechanical means is provided for using airspeed dynamic pressure to actuate a pyrotechnic or mechanical escape generating system. In this manner the operation of an escape system is varied as a function of the airspeed.

The existing automatic parachute release structure in the Mayo et al. patent is modified by the addition of a second bellows connected to a pitot head which is exposed to the total pressure of the airstream. Since the exterior of the bellows is exposed to atmospheric pressure, the bellows will expand or contract as a function of the spring rate of the bellows and the dynamic pressure of the airstream. In this arrangement the firing mechanism will be released by the combined contraction of both bellows. Each bellows will be provided with internal stops to ensure that release of the firing mechanism does not occur until a combination of predetermined values of atmospheric pressure and dynamic pressure are present.

DETAILED DESCRIPTION OF ILLUSTRATIVE EMBODIMENTS

Figure 1:
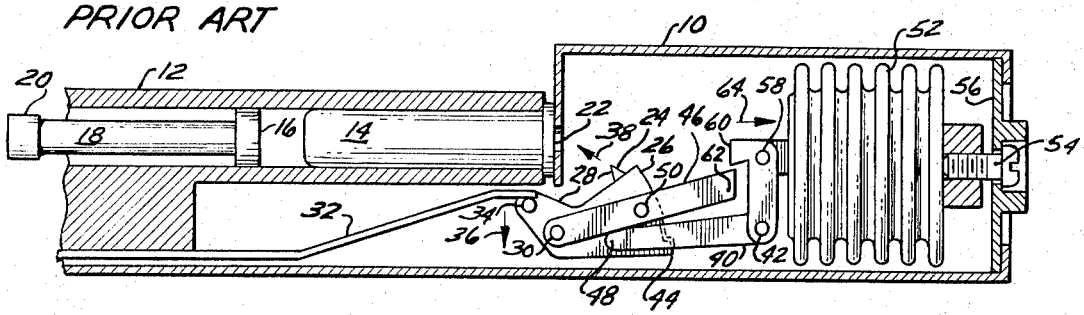
FIG. 1 is a sectional elevational view of a prior art embodiment.

Reference is now made to the prior art device shown in FIG. 1 wherein there is shown a housing 10 enclosing the components of the operating mechanism of the present device and maintaining certain parts in their proper assembled relationship. Attached to one end is a combined barrel and cylinder 12 into which is placed a cartridge 14 and a gas operated piston 16 to which is affixed one end of the piston rod 18 having an attaching member 20 at its other end. Movement of this attaching member 20 effects release of a parachute, not shown. Housing 10 has an opening 22 therein in alignment with the cap of cartridge 14 to permit firing pin 24 to pass into the opening and against the cap of cartridge 14 to cause it to fire. This moves the attaching member 20 for release of the parachute. Firing pin 24 is mounted on a hammer 26 which is part of bellcrank 28 pivotally mounted at pivot 30. A leaf spring 32 bears against end 34 of bellcrank 28 to urge its movement in the direction of arrow 36 and the movement of firing pin 24 in the direction of arrow 38.

Firing pin 24 is maintained in the cocked position shown by means of arm 40 pivotally mounted at 42 and adapted to engage a lip 44 on the bellcrank 28. A second arm 46 pivotally mounted at 30 bears downwardly against the end 48 of arm 40 and is held in this position by means of an arming pin 50 passing through arm 46 and bellcrank 28. In this cocked and armed position, firing cannot occur regardless of the atmospheric pressure causing retraction of bellows 52.

Bellows 52 is adjustably mounted at one end with a set screw 54 to end 56 of housing 10. The other end of bellows 52 is pivotally mounted at 58 to a sear 60 which passes over free end 62 of arm 46. Thus, in the denser atmosphere such as on takeoff and landing, the bellows 52 will compress and sear 60 moves in the direction of arrow 64 but arm 46 will not pivot because of the arming pin 50. However, when arming pin 50 has been removed, such as upon seat ejection, for example, and sear 60 moves in the direction of arrow 64, arm 46 will pivot about pivot 30 to free end 48 of arm 40 for pivotal movement about pivot 42. This, in turn, frees hammer 26 for rotation about pivot point 30 due to the action of leaf spring 32 and firing pin 24 passes through opening 22 to strike the cap of cartridge 14. Set screw 54 may be adjusted for the desired atmospheric pressure at which this actuation is desired.

Figure 2:
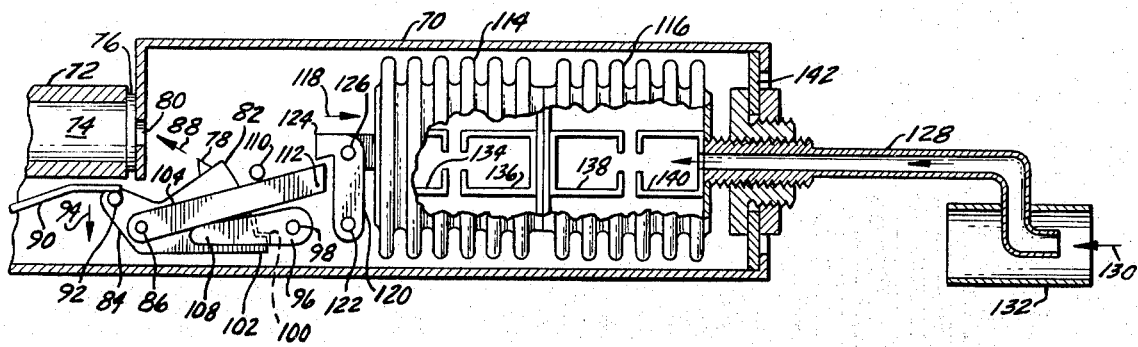
FIG. 2 is a sectional elevational view of one embodiment of the actuator of the present invention.

Reference is now made to FIG. 2 which shows a first embodiment of the present invention in which a second bellows, connected to a pitot head exposed to the total pressure of the airstream, is added to the first bellows such that the firing mechanism will be released by the combined contraction of both bellows. This ensures that the aircraft is low enough and slow enough before the parachute ejection is initiated. Except for this additional function and structure for providing this function, much of the structure is similar to that in the prior art. Here there is shown a housing 70 containing and protecting the actuation mechanism and maintaining the various parts in their proper assembled relationship. The combined barrel and cylinder 72 is positioned in front of the housing and contains a cartridge 74 which generates expansion gases when its precision cap 76 is struck by firing pin 78 when it passes through opening 80 in the housing 70. This firing pin is on a hammer 82 which is part of a bellcrank 84 pivotally mounted at 86 and urged in the direction of arrow 88 by leaf spring 90 urging end 92 of the bellcrank downwardly in the direction of arrow 94. Bellcrank 84 is maintained in its cocked position, as shown, by a cocking arm 96 pivotally mounted at 98. Arm 96 has a flange portion 100 abutting a retaining lip 102 on the bellcrank. Arm 96 is held in this position by arm 104, also pivotally mounted at 86 and bearing against end 108 of arm 96. An arming pin 110 holds the end 112 of arm 104 from rotation about its pivot point 86 so that the lateral movement of bellows 114 and 116 in the direction of arrow 118 will not actuate the firing mechanism. A latch or sear is pivotally mounted at 122 and has a catch 124 against which end 112 of arm 104 is held when arming pin 110 is removed. Movement of sear 120 in the direction of arrow 118 then releases end 112 and the firing is initiated.

Sear 120 is pivotally connected at 126 to the inner end of bellows 114 which extends and compresses with atmospheric pressure at the aircraft altitude. Bellows 116 is attached in series to the bellows 114 and its inside is exposed to total pressure from the airstream. This is done by connecting a fluid passage 128 to the airstream, represented by arrow 130, in a pitot head 132. In this manner the greater the airspeed of the aircraft, the greater is the elongation of bellows 116 and unlatching and firing will not occur. However, a lesser airspeed will permit contraction of bellows 116 to move latch 124 in the direction of arrow 118, freeing arm 104 for actuation of the cartridge 74. Each bellows is provided with limit stops 134, 136, 138 and 140 in order that too much compression of one of the bellows will not actuate the mechanism in the absence of sufficient compression by the other. In this manner, for example, a zero airspeed will not cause an excessive contraction of bellows 116 and triggering of the mechanism while the aircraft is still at a high altitude and bellows 114 has not been contracted. Similarly, excessive contraction of bellows 114, as when the aircraft is at low altitude, will not trigger the mechanism when the airspeed is above a predetermined level and bellows 116 has not contracted the desired amount. The end of bellows 116 is adjustably attached to the end 142 of housing 70 for adjustment purposes.

Figure 3:
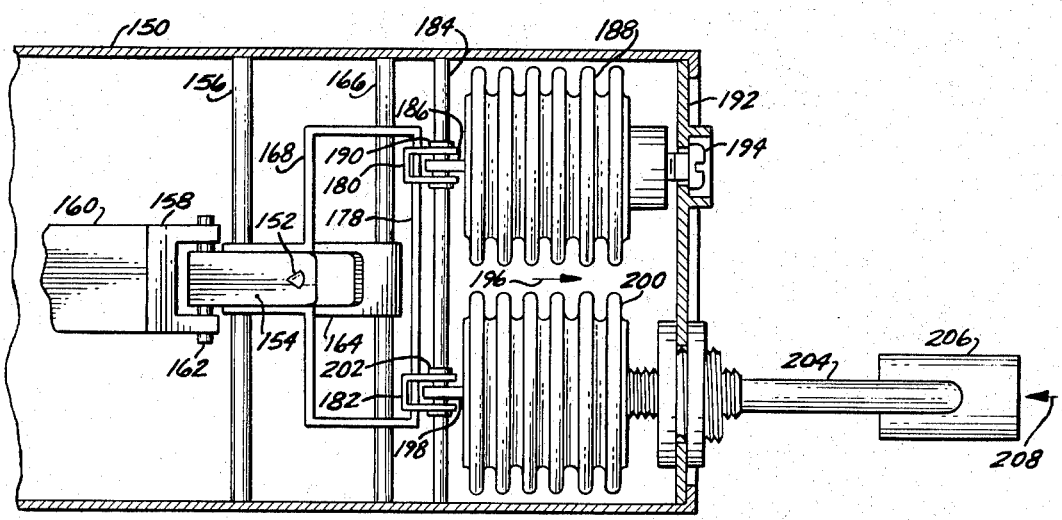
FIG. 3 is a sectional plan view of a second embodiment.

A plan view of an alternative embodiment is shown in FIG. 3 wherein the additional bellows sensing dynamic pressure is placed in parallel with the bellows sensing atmospheric pressure. Here there is shown a portion of a housing 150. Firing pin 152 is on bellcrank 154 which is pivotally mounted on pivot pin 156 mounted between the two side walls of housing 150. End 158 of leaf spring 160 bears down on pin 162 at the end of bellcrank 154 to cause rotation of the bellcrank in a manner previously described. Lever arm 164 pivotally mounted on pin 166 engages the bellcrank 154. Lever arm 168 pivotally connected to pin 156 retains arm 164 in its engaging relationship with bellcrank 154. Arm 168 has a laterally extending cross arm 178 which may be engaged and retained by either of two latches 180, 182. Latch 180 is pivotally mounted on pin 184 and is pivotally connected to end 186 of bellows 188 by pin 190. Bellows 188 is adjustably mounted on end 192 of housing 150 by adjustable screw 194. When bellows 188 contracts, latch 180 moves in the direction of arrow 196 and frees itself from engagement with the lateral member 178 of arm 168.

Similarly, latch 182 is pivotally connected on pin 184 and is connected to end 198 of bellows 200 by pin 202. The other end of bellows 200 is adjustably connected to end 192 of housing 150, the inside of bellows 200 is connected through a passage 204 to the pitot head 206 where it is subjected to dynamic pressure of the airstream represented by arrow 208. As this pressure decreases, bellows 200 contracts in the direction of arrow 196 and latch 182 is removed from over the lateral cross arm 178 of lever arm 168. When both latches 180 and 182 are removed, arm 168 pivots forwardly on pin 156 to free arm 164 which pivots on pin 166 and thus permits bellcrank 154 to rotate in response to the pressure of the leaf spring 160 and initiate the firing. In this arrangement the firing mechanism is released by the combined contraction of both bellows and firing will not occur until accommodation of predetermined values of atmospheric pressure and dynamic pressure are present. This arrangement separates the altitude and speed functions and may facilitate the precise adjustment of each of the bellows. This embodiment, as well as that in FIG. 2, is designed for low altitude, low speed actuation.

Figure 4:
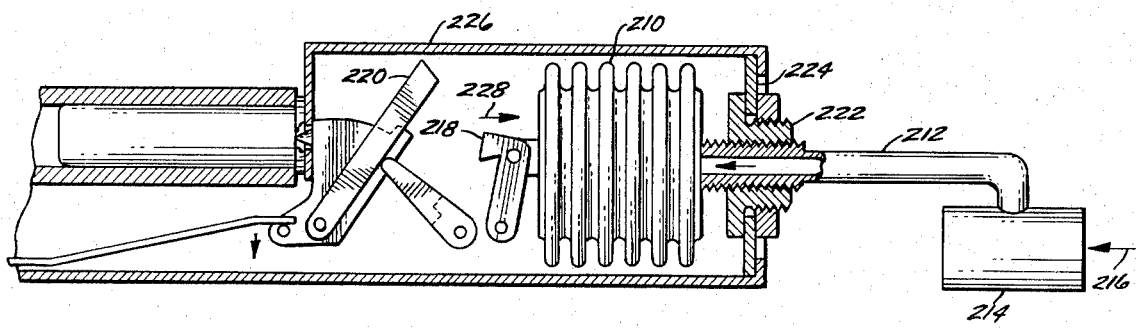
FIG. 4 is a sectional elevational view of a third embodiment shown after firing.

In FIG. 4 there is shown an embodiment wherein the firing mechanism has already been actuated. This embodiment differs from the prior art embodiment in FIG. 1 in that the bellows 210 in FIG. 4 is connected through passage 212 to a pitot head 214 whereby the total pressure of the airstream depicted by arrow 216 is sensed by the bellows, and latch 218 retains arm 220 in its cocked position such as is shown in FIGS. 1 and 2. When the airspeed has been reduced below the pre-established level, determined by proper adjustment of the adjustment nut 222 which retains the end of the bellows in spaced relationship to end 224 of housing 226, latch 218 is urged in the direction of arrow 228 to cause actuation. This embodiment is a low speed actuator which actuates only after the aircraft has reduced its airspeed below a predetermined level.

Figure 5:
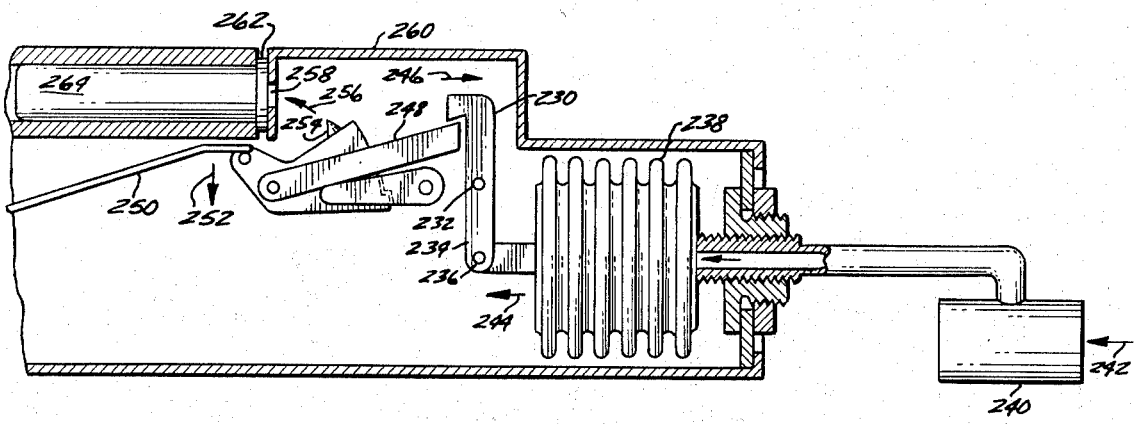
FIG. 5 is a sectional elevational view of a fourth embodiment shown in cocked position.

The embodiment shown in FIG. 5 shows a modification of the latching arm 230 for high speed actuation. Here the arm is pivoted at its center at point 232 and its lower end 234 is pivotally connected at 236 to bellows 238. This bellows is connected to a pitot head 240 so that it is responsive to the dynamic pressure of the airstream as depicted by arrow 242. The triggering mechanism and the adjustment feature in this embodiment is substantially the same as in the others and therefore will not be further described. When the airspeed exceeds a predetermined level, the bellows 238 expands and moves in the direction of arrow 244 to move the upper portion of latch 230 in the direction of arrow 246. This frees the latch from arm 248 and the action of leaf spring 250 in the direction of arrow 252 causes firing pin 254 to move in the direction of arrow 256 and to pass through opening 258 in housing 260 to strike the percussion cap 262 of cartridge 264. It thus can be seen that by revising the mechanism and rearrangement of the bellows the operation of either or both the altitude and speed functions can be reversed so that the device can cause the firing mechanism to be released at high altitude, high speed, high altitude and high speed, high altitude and low speed, and low altitude and high speed. A primary application of this actuator is in the control of the actuation of any escape sub-system whose operation is dependent upon speed or altitude conditions. Typical sub-system applications include drogue, parachute deployment, drogue parachute release, recovery parachute deployment, release of recovery parachute from seat, and release of a crewman from a seat.

Having thus described an illustrative embodiment of the present invention, it is to be understood that modifications thereof will become apparent to those skilled in the art and that these deviations are to be construed as part of the present invention.

I claim:

1. A speed sensitive actuator comprising:
   a sensing device comprising a bellows having the inside thereof connected to a passageway exposed to dynamic pressure of an airstream,
   a gas expansion means,
   a firing mechanism for actuating said gas expansion means,
   said firing mechanism including a bellcrank pivotally mounted between cocked and actuated positions and spring urged to actuated position to cause a firing pin thereon to strike and thus actuate said gas expansion means, and
   latch means operatively connected between said sensing device and said bellcrank to retain said bellcrank in cocked position until released in response to predetermined dynamic pressure on said sensing device.

2. A speed sensitive actuator as in claim 1 wherein said bellows has a limit stop thereon to limit compression of said bellows upon reduction of dynamic pressure thereon.

3. A speed sensitive actuator as in claim 1, said latch means including a lever arm engageable with said bellcrank,
   said latch means also including a sear with a latch thereon movable upon change in dynamic pressure upon said sensing means, said latch being engageable with said lever arm to retain its engagement with said bellcrank in cocked position, said latch being releasable from said lever arm to permit movement of said bellcrank to actuated position.

4. A speed sensitive actuator as in claim 3 wherein said latch is movable upon reduction of said dynamic pressure upon said sensing means below a predetermined value.

5. A speed sensitive actuator as set forth in claim 1 wherein said sensing device includes an altimeter means connected to said latch means to retain said bellcrank in cocked position until said actuator has reached a predetermined altitude.

6. A speed sensitive actuator as set forth in claim 5 wherein said altimeter means is a bellows, said sensing device is a bellows, and both said bellows are connected in series to actuate said latch means at predetermined altitude and at predetermined dynamic pressure.

7. A speed sensitive actuator as set forth in claim 6 wherein both said bellows have limit stops thereon to limit compression thereof.

8. A speed sensitive actuator as set forth in claim 5 wherein said altimeter means is a bellows, said sensing device is a bellows, and both said bellows independently retain said latch means to hold said bellcrank in cocked position until said actuator has reached a predetermined altitude and dynamic pressure.

9. A speed sensitive actuator as set forth in claim 8 wherein both said bellows are mounted in side-by-side relationship and each has its own latch, a lever arm engageable with said bellcrank, said lever arm having a laterally extending cross arm engageable with and retained by either of said latches until both said latches are removed therefrom by both said bellows.

* * * * *